United States Patent
Saum

Patent Number: 5,878,843
Date of Patent: Mar. 9, 1999

[54] LAMINATED BRAKE ROTOR

[75] Inventor: John E. Saum, Canton, Mich.

[73] Assignee: Hayes Lemmerz International, Inc., Romulus, Mich.

[21] Appl. No.: 54,729

[22] Filed: Apr. 3, 1998

Related U.S. Application Data

[60] Provisional application No. 60/059,879 Sep. 24, 1997.

[51] Int. Cl.⁶ .................................................... F16D 65/10
[52] U.S. Cl. .................................. 188/218 XL; 188/73.2; 188/218 A; 188/250 E; 188/251 A; 188/251 M
[58] Field of Search .......................... 188/218 XL, 73.2, 188/251 M, 251 R, 251 A, 218 A, 264 R, 264 CC, 71.5, 18 A, 250 B, 250 G, 259, 252, 253, 255–258, 250 R, 250 E; 192/70.14, 70.12, 107 M, 107 R, 107 T, 109 B; 164/9.8; 428/252; 295/7, 8; 74/443; 301/6.91; 181/207, 208, 209

[56] References Cited

U.S. PATENT DOCUMENTS

| | | |
|---|---|---|
| 2,255,024 | 9/1941 | Eksergian ........................... 188/218 XL |
| 3,231,058 | 1/1966 | Batchelor et al. ................. 188/218 XL |
| 4,049,090 | 9/1977 | Buell ................................... 188/251 M |
| 4,177,883 | 12/1979 | Margetts .......................... 188/218 XL |
| 4,290,510 | 9/1981 | Warren . |
| 4,674,351 | 6/1987 | Byrd ........................................... 74/443 |
| 5,092,192 | 3/1992 | Pelzer ........................................ 74/443 |
| 5,224,572 | 7/1993 | Smolen, Jr. et al. . |
| 5,242,746 | 9/1993 | Bommier et al. ................... 188/251 R |
| 5,299,667 | 4/1994 | Hammond . |
| 5,501,306 | 3/1996 | Martino ............................. 188/218 XL |
| 5,509,510 | 4/1996 | Ihm .................................. 188/218 XL |
| 5,526,914 | 6/1996 | Dwivedi et al. . |
| 5,613,578 | 3/1997 | Moseley et al. .................. 188/218 XL |
| 5,626,211 | 5/1997 | Gewelber et al. ................. 188/218 XL |

*Primary Examiner*—Douglas C. Butler
*Attorney, Agent, or Firm*—Marshall & Melhorn

[57] ABSTRACT

A brake rotor includes a radially inner hub or hat section having a central mounting face for mounting the rotor on an associated drive member, with an outer friction portion extending from the cylindrical hat wall. The outer friction portion includes a pair of opposite, flat annular friction rings adapted to interface with associated friction members. The outer friction portion of the rotor further includes a core extending radially outwardly from the cylindrical hat wall of the hat section. A layer of a sound dampening material is secured between the pair of outer friction ring sections and the core. The rotor of the invention transmits less noise than conventional rotors.

16 Claims, 1 Drawing Sheet

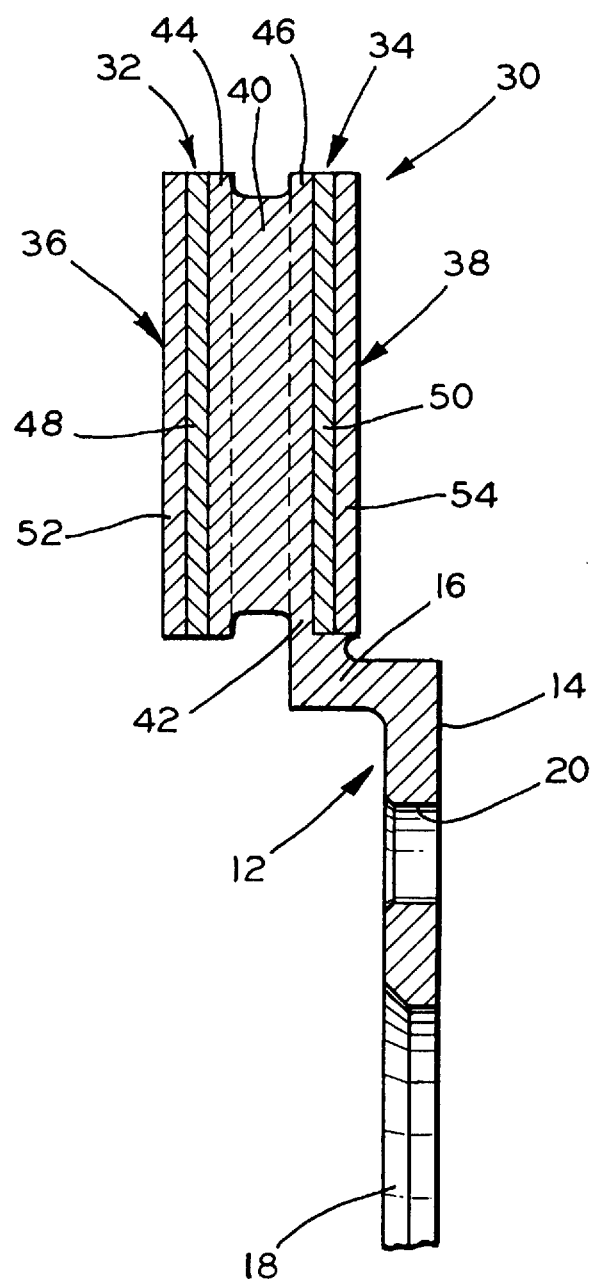

LAMINATED BRAKE ROTOR

RELATED APPLICATION

This application is claiming the benefit, under 35 USC §119(e), of the provisional application filed Sep. 24, 1997 under 35 USC § 111(b), which was granted a Ser. No. of 60/059,879. The provisional application, Ser. No. 60/059,879, is hereby incorporated by reference in its entirety.

BACKGROUND OF THE INVENTION

The present invention relates to rotors for caliper disc brakes and the like, and in particular to such rotors having a laminated construction.

Rotors are generally well known in the art, and are used extensively in caliper disc brakes, power transmission devices, clutches, and other similar machinery and mechanisms. Conventional rotors are formed of a radially inner hub or hat section having a central mounting face for mounting the rotor on an associated drive member, with an outer friction portion extending from the cylindrical hat wall. The outer friction portion includes a pair of opposite, flat annular friction surfaces adapted to interface with associated friction members, such as brake pads. The outer friction portion of the rotor may be vented or solid.

Brake rotors are typically cast from a ferrous material such as grey iron, and then are machined in multiple operations to shape the rotor, and form the opposite friction surfaces which interface with associated brake pads. Cast aluminum rotors are available to reduce the weight and corrosion problems associated with ferrous metal rotors, although the heat resistance and brake surface toughness of cast aluminum is typically less desirable than that of other types of rotors.

In addition, there are some composite rotors, in which different portions of the rotor are formed of different materials. For instance, the Ihm U.S. Pat. No. 5,509,510 discloses a composite rotor having combination of separate components including a friction portion formed of an aluminum metal matrix composite and a hub portion comprised of aluminum.

While the conventional rotors function in an effective manner, one of the problems associated with such brake rotors is the transmittance of noise which is audible to vehicle operators. It would therefore be desirable to provide an improved rotor which results in the reduction of noise while maintaining the desired braking performance.

SUMMARY OF THE INVENTION

In accordance with the invention, there is provided a brake rotor having a hat section and an outer friction portion. The hat section of the rotor includes a central mounting face with a cylindrical hat wall extending therefrom. The outer friction portion of the rotor includes a core extending radially outwardly from the cylindrical hat wall of the hat section and a pair of annular ring sections. A layer of a sound dampening material is secured between the pair of outer friction ring sections and the core. The sound dampening material has a greater tendency to dampen the transmission of sound therethrough relative to the material forming the outer friction ring sections. The rotor of the invention thus transmits less noise than conventional rotors.

BRIEF DESCRIPTION OF THE DRAWING

The advantages of the invention will become readily apparent to those skilled in the art from the following detailed description of a preferred embodiment when considered in the light of the accompanying drawing, which is a cross-sectional view of the upper one-half of a rotor embodying the present invention.

DESCRIPTION OF THE PREFERRED EMBODIMENTS

For purposes of description herein, the terms "upper," "lower," "right," "left," "rear," "front," "vertical," "horizontal," and derivatives thereof shall relate to the invention oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to the drawing, there is illustrated in the drawing FIGURE a rotor embodying the present invention and designated generally with the reference numeral 10. The rotor 10 is of the type adapted for use in conjunction with a variety of mechanical devices, especially caliper disc brakes and the like.

The rotor 10 includes a radially inner hub or hat section 12 having a central mounting face 14 for mounting the rotor 10 on an associated drive member (not shown), such as a spindle or vehicle axle. The hat section 12 also includes a generally cylindrical shoulder or hat wall 16 extending from the periphery of the mounting face 14.

The central mounting face 14 of the hat section 12 of rotor 10 is provided with a central pilot aperture 18 in which a spindle hub or the like (not shown) may be closely received, and a plurality of circumferentially spaced apart fastener apertures 20 in which fasteners (also not shown) may be received to mount the rotor 10 on an associated drive mechanism in the conventional manner.

The rotor 10 also includes an outer friction portion, denoted generally by the reference numeral 30 in the drawing, which extends from the cylindrical hat wall 16. The outer friction portion 30 includes a pair of annular ring sections 32 and 34 having respective flat annular friction surfaces 36 and 38 which are adapted to interface with associated friction members (not shown), such as brake pads or the like. In the illustrated embodiment, the ring sections 32 and 34 are fixedly interconnected in a mutually parallel, spaced apart relationship by a plurality of circumferentially spaced apart support ribs 40 extending therebetween. Alternatively, it will be appreciated that the invention can be applied to a solid rotor. As described to this point, the construction of the rotor is conventional. In accordance with the invention, the ring sections 32 and 34 are formed of laminated construction, as follows. A core 42 extends from the hat section 12 of the rotor 10. In the illustrated embodiment, the core 42 includes the plurality of ribs 40, as well as a pair of flat annular ring sections 44 and 46. Obviously, where the invention is applied in a solid rotor, the core will be solid with a pair of opposed, flat annular surfaces.

The core 42 is preferably formed integrally with the hat section 12 of the rotor 10. The core 42 and hat section 12 may be formed of any suitable material, such as iron, steel, aluminum or the like. Preferably, the core 42 and hat section 12 are cast to form a monolithic part from grey iron.

A pair of flat, annular sound-dampening ring sections 48 and 50 are applied to the respective outer surfaces of the core ring sections 44 and 46. The sound-dampening ring sections 48 and 50 may be formed of any suitable material which has a greater tendency to dampen the transmission of sound therethrough relative to the material forming the outer, friction ring sections described below. Aluminum is a preferred material for forming the sound-dampening ring sections 48 and 50.

Finally, a pair of flat, annular outer friction ring sections 52 and 54 are applied to the respective outer surfaces of the sound-dampening ring sections 48 and 50. It is the outer surfaces of the outer friction ring sections 52 and 54 which are adapted to interface with the associated friction members. The outer friction ring sections 52 and 54 are formed of a relatively hard, wear resistant material which exhibits less of a tendency to dampen the transmission of sound therethrough relative to the material forming the sound-dampening ring sections 48 and 50. Preferred materials for forming the outer friction ring sections 52 and 54 include hardened steel, ceramics and iron, with hardened steel being the most preferred material. Thus, a most preferred construction for the rotor 10 of the invention is a hat section 12 and core 42 formed integrally of cast grey iron, a pair of sound dampening ring sections 48 and 50 formed of aluminum, and a pair of outer friction ring sections 52 and 54 formed of hardened steel.

The sound-dampening ring sections 48 and 50 may be secured to the core ring sections 44 and 46, and the outer friction ring sections 52 and 54 may be secured to the sound-dampening ring sections 48 and 50, by any suitable means. Examples include the use of mechanical fasteners such as rivets, adhesive bonding, or the electrical or chemical deposition of one layer over the previous layer.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A brake rotor comprising
   a hat section having a central mounting face with a cylindrical hat wall extending therefrom; and
   an outer friction portion including a core extending radially outwardly from the cylindrical hat wall of the hat section, a pair of annular ring sections, and a sound dampening layer secured between the pair of outer friction ring sections and the core, wherein the sound dampening layer is formed of a material having a greater tendency to dampen the transmission of sound therethrough relative to the material forming the outer friction ring sections.

2. A brake rotor as defined in claim 1, wherein said sound dampening layer is annular.

3. A brake rotor as defined in claim 2, wherein said core comprises a solid annulus.

4. A brake rotor as defined in claim 1, wherein said ore comprises a plurality of circumferentially spaced apart support ribs.

5. A brake rotor as defined in claim 1, wherein said core is formed integrally with said hat section.

6. A brake rotor as defined in claim 5, wherein said core and said hat section are cast from a metal to form a monolithic part.

7. A brake rotor as defined in claim 5, wherein said core and said hat section are cast from grey iron.

8. A brake rotor as defined in claim 1, wherein said sound dampening layer is comprised of aluminum.

9. A brake rotor as defined in claim 1, wherein said outer friction ring sections are comprised of iron.

10. A brake rotor as defined in claim 1, wherein said outer friction ring sections are comprised of hardened steel.

11. A brake rotor as defined in claim 1, wherein said outer friction ring sections are comprised of a ceramic material.

12. A brake rotor as defined in claim 1, further comprising a plurality of mechanical fasteners which interconnect said outer friction ring sections, said sound dampening layer and said core.

13. A brake rotor as defined in claim 1, further comprising an adhesive layer interposed between said outer friction ring sections and said sound dampening layer.

14. A brake rotor as defined in claim 1, further comprising an adhesive layer interposed between said sound dampening layer and said core.

15. A brake rotor comprising:
   a hat section including a central mounting face and a cylindrical hat wall extending from said mounting face; and
   a pair of annular ring sections formed with a laminated construction comprising a pair of sound dampening ring sections with a pair of outer friction ring sections secured thereto, wherein the sound dampening ring sections are formed of a material which has a greater tendency to dampen the transmission of sound therethrough relative to the material forming the outer friction ring sections.

16. A brake rotor comprising:
   a hat section including a central mounting face and a cylindrical hat wall extending from said mounting face; and
   a core formed integrally of cast grey iron with and extending from the hat wall of the hat section;
   a pair of sound dampening ring sections comprised of aluminum and secured to the core; and
   a pair of outer friction ring sections formed of steel and secured to the sound dampening ring sections.

* * * * *